United States Patent [19]
Salmen et al.

[11] Patent Number: 5,795,366
[45] Date of Patent: Aug. 18, 1998

[54] METHOD OF MANUFACTURING A NON-SAG TUNGSTEN WIRE FOR ELECTRIC LAMPS

[75] Inventors: Michael Salmen, Munich, Germany; Hans-Joachim Lunk, Towanda, Pa.; Alfred-Georg Gahn, Koenigsbrunn, Germany; Bernhard Altmann, Langerringen, Germany; Martin Fait, Berlin, Germany

[73] Assignee: Patent-Treuhand-Gesellschaft fuer elektrische Gluehlampen mbH, Munich, Germany

[21] Appl. No.: 608,552

[22] Filed: Feb. 28, 1996

[30] Foreign Application Priority Data

Mar. 3, 1995 [DE] Germany .......... 195 07 554.4

[51] Int. Cl.[6] ........................................ B22F 9/24
[52] U.S. Cl. ................. 75/368; 75/369; 75/371; 419/4
[58] Field of Search ............. 75/351, 368, 369, 75/370, 371; 419/4, 63

[56] References Cited

U.S. PATENT DOCUMENTS

| 3,927,989 | 12/1975 | Koo ............................ 419/4 |
| 5,072,147 | 12/1991 | Pugh et al. ................. 313/341 |
| 5,087,299 | 2/1992 | Fukuchi et al. ............... 419/4 |

FOREIGN PATENT DOCUMENTS

| 1169677 | 5/1964 | Germany ...................... 75/351 |
| 50-92 806 A | 7/1975 | Japan |

OTHER PUBLICATIONS

"The Metallurgy of Doped/Non–Sag Tungsten", edited by Erwin Pink and Laszlo Bartha, Elsevier Applied Science, London (1989), pp. 4–19, 30–35, 84–99.

"Bubbles —Chemische Untersuchungen zur Herstellung kaliumdotierter Wolframpulver für die Glühlampenproduktrion"(Bubbles –Chemical Investigations Relating to the Manufacture of Potassium Doped Tungsten Powder for the Production of Incandescent Lamps, Thesis by Alfred Gahn, Ludwig–Maximilians–University, Munich, 1986.

*Primary Examiner*—George Wyszomierski
*Attorney, Agent, or Firm*—Frishauf, Holtz, Goodman, Langer & Chick, P.C.

[57] ABSTRACT

To essentially eliminate aluminum and silicon as contaminants in a doped tungsten wire, the tungsten wire is obtained by mechanical working of reduced tungsten blue oxide which contains as a primary or major constituent a special hexagonal ammonium tungsten bronze of the general formula $(NH_4)_x(NH_3)_yWO_3$. A liquid doping step is carried out by adding a solution containing potassium nitrate, the special doped ammonium tungsten bronze forming preferably more than 70% by weight of the overall tungsten blue oxide. The special hexagonal ammonium tungsten bronze is made by decomposing ammonium paratungstate in an ammonium atmosphere, preferably at a temperature between about 400° and 550° C.

12 Claims, 1 Drawing Sheet

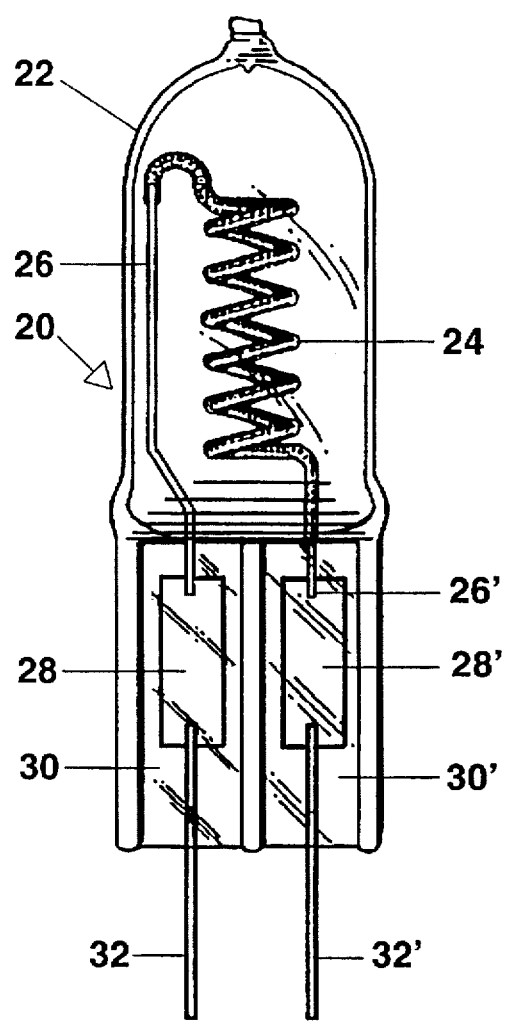

METHOD OF MANUFACTURING A NON-SAG TUNGSTEN WIRE FOR ELECTRIC LAMPS

Reference to related application, assigned to the assignee of the present invention, the disclosure of which is hereby incorporated by reference:

U.S. Ser. No. 08/608,550 filed Feb. 28, 1996, FAIT et al.

Reference to related patent, the disclosure of which is hereby incorporated by reference:

U.S. Pat. No. 5,072,147, Pugh et al.

Reference to related publications:

"The Metallurgy of Doped/Non-Sag Tungsten", edited by Erwin Pink and Laszlo Bartha, Elsevier Applied Science, London (1989).

"BUBBLES—Chemische Untersuchungen zur Herstellung kaliumdotierter Wolframpulver für die Glühlampenproduktion" ("BUBBLES—Chemical Investigations Relating to the Manufacture of Potassium Doped Tungsten Powder for the Production of Incandescent Lamps"), Thesis by Alfred Gahn, Ludwig-Maximilians-University, Munich, 1986.

FIELD OF THE INVENTION

The present invention relates to a method to make a non-sag, and essentially non-vibrating tungsten wire for use in heat and light-radiating devices, typically incandescent lamps, heat lamps and the like, to a wire made by the process, and lamps utilizing such a wire.

In the specification and claims, all percentages are by weight, unless otherwise stated.

BACKGROUND

The referenced U.S. Pat. No. 5,072,147, Pugh et al, describes tungsten wires for use in incandescent lamps. The tungsten wire which is used in the filament of the incandescent lamps is subject to high mechanical loading and stresses, and especially when it is used in lamps or high-temperature radiators having an operating temperature of about 3,000° C. Tungsten wires are made, in principle, in various stages in accordance with the well-known Coolidge method, according to which a decomposed ammonium paratungstate, also known as tungsten blue oxide is made. The referenced literature "The Metallurgy of Doped/Non-Sag Tungsten", edited by Erwin Pink and Laszlo Bartha, Elsevier Applied Science, London (1989), and especially pages 4–12, 31–34 and 85–95, describes how, first, ammonium paratungstate is obtained from tungsten and which, thereafter, by heating in hydrogen and/or nitrogen, is decomposed to tungsten blue oxide.

Pure tungsten wire, as is known, is not suitable to make filaments for incandescent lamps, heat lamps and the like. After only a short operating time, individual pieces of the filament coil have the tendency to offset, or slide off with respect to each other. A lamp having such filaments will therefore fail prematurely. To prevent offsetting, it has been proposed to dope the blue tungsten oxide with solutions containing potassium, aluminum, and silicon particularly, potassium silicate and aluminum nitrate or aluminum chloride doping solutions were used. Direct doping of tungsten with potassium is not possible due to the low solubility of potassium in alpha tungsten. The doped tungsten blue oxide is then reduced with hydrogen to tungsten powder. The tungsten powder is then treated, and thereafter compacted by compression, sintering, swaging and drawing. Drawing processes can work down tungsten wire doped with potassium to diameters of about 15 μm for use in coiled filaments. The doping content of the wire will then be about 100 to 160 ppm potassium, 120 to 220 ppm silicon and 50 to 80 ppm aluminum.

It is well known, and also referred to in the above publication "The Metallurgy of Doped/Non-Sag Tungsten" to precipitate tungsten acid $WO_3 \cdot H_2O$ already doped, from a solution of potassium-sodium-silicate and potassium-sodium-tungstate by means of HCl.

Tungsten blue oxide is defined, essentially, by a hexagonal ammonium tungsten bronze (abbreviated AWB), having a composition of $(NH_4)_x WO_{3-x}$, wherein x=0.05 to 0.1, see, particularly, the article "BUBBLES—Chemische Untersuchungen zur Herstellung kaliumdotierter Wolframpulver für die Glühlampenproduktion" ("BUBBLES—Chemical Investigations Relating to the Manufacture of Potassium Doped Tungsten Powder for the Production of Incandescent Lamps"), Thesis by Alfred Gahn, Ludwig-Maximilians-University, Munich, 1986, particularly pages IX–XII and pages 1–24. Another representation of tungsten blue oxide is $xNH_3 \cdot yH_2 \cdot WO_n$. The blue oxide, besides the AWB, may also contain portions of $WO_3$, and further $W_{20}O_{58}$, and other oxides. The quantity of the additives frequently added by solutions, with respect to the tungsten content of the blue oxide is typically about 2,500 ppm/W for potassium, about 1,500 ppm/W for silicon and about 500 ppm/W for aluminum. The additive effect or doping effect, respectively, influences the reduction and sinterkinetic processes, but controls, primarily, the recrystallization processes of doped tungsten wires. These recrystallization processes lead to the formation of a structure with, with respect to the wire diameter, elongated crystallites (about 15 to 25 times as long as the wire diameter) which overlap and interlock at grain boundaries. This structure, which can be termed a stacked or shingled structure, is characterized by inhibiting the movement transversely to the axis of the wire of the grain boundaries. The interlocking of the crystallites prevents the mutual offsetting. The stacked structure is a true microalloy which contains the technologically effective alloying component, the metallic potassium, in the region of a trace concentration of up to about 120 ppm. In a wire, the potassium is in form of bubbles in rows along the grain boundaries, similar to a string of pearls. They have diameters of a few nanometers to micrometers, and control the recrystallization behavior. It appears that the interlocking of the crystallites provides for form or shape stability at the operating temperature and results in the required mechanical strength, that is, provides for nonsag, or at least low-sag quality.

The tungsten blue oxide which results from thermal decomposition of ammonium paratungstate tetrahydrate (APW) in a reduced atmosphere does not represent a uniform phase, but rather a mixture of varied portions of hexagonal ammonium tungsten bronze, tungsten (VI) oxide, tungsten suboxides, as well as substantial proportions of X-ray amorphous components. It has been found that the separate components of the tungsten blue oxide, when individually isolated for experimental purposes, differ substantially in their characteristics regarding suitability for doping. Consequently, tungsten blue oxides of different compositions will respond differently to doping and have different doping results with respect to concentration of potassium.

A disadvantage of known processes is the non-homogeneous distribution of the doping components potassium, aluminum and silicon, caused, for example, by local formation of crusts, due to the doping compounds. The doping elements silicon and aluminum, which are used in combination with potassium, result in a high loading of the tungsten matrix and, when they vaporize during sintering, at temperatures of about 2,600° C. of the sintering processor, nearly completely leave the tungsten matrix. After sintering, only a few percent of the doping elements remains in the tungsten.

THE INVENTION

It is an object of the present invention to provide a method which results in tungsten wires, particularly suitable for coiled and coiled-coil filaments for electric lamps, for example, incandescent lamps, heat lamps and lamps equipped with wires which are made by the improved process.

Briefly, the tungsten blue oxide contains as a mature or primary substance, a special hexagonal ammonium tungsten bronze of the formula $$(NH_4)_x(NH_3)_yWO_3 \qquad (1)$$

between 0.25 and preferably 0.30 to 0.33, preferably less than 0.03 wherein x is 0.33, and y is less than 0.05.

The doping substance is in liquid form and is carried out with a potassium containing solution.

The gist of the invention is the formation of a special tungsten blue oxide. The primary component 60%–95%, preferably more than 70%, is the aforementioned hexagonal ammonium tungsten bronze of the special formula (1). Other components can be $WO_3$ and $W_{20}O_{58}$ for example. This permits introduction of the special element potassium alone by means of a potassium containing solution, thereby avoiding the detour of doping with further components. The liquid doping substance is effectively devoid of silicon and aluminum and, preferably, is potassium nitrate. Other examples are potassium chloride or other potassium halides. Small contaminant or trace quantities of silicon and aluminum in the order of up to about 30 ppm (without reference to potassium) are possible. The special hexagonal ammonium tungsten bronzes, as primary components of the tungsten blue oxide, are capable, based on their structure, to incorporate potassium by ion exchange processes, and thereby fit potassium homogeneously within the tungsten blue oxide matrix and hence in the tungsten structure obtained by reduction.

The process has the specific advantage that the homogeneous distribution of potassium within the tungsten sinter rod which is obtained thereby results in decreased stressing or loading of the tungsten matrix by the foreign elements silicon and aluminum, upon subsequent mechanical working, for example by sintering, rolling, swaging, and drawing.

In accordance with a feature of the invention, the new process includes the following two steps:

(a) synthesis of the special tungsten blue oxide, the primary component of which is a hexagonal ammonium tungsten bronze of the formula (1) above, particularly by decomposition of ammonium paratungstate in an ammonium atmosphere, additionally, or replacing the previously exclusively used hydrogen atmosphere. This step is, preferably, carried out at a temperature of between 400° and 550° C.;

(b) liquid doping the tungsten blue oxide with a potassium containing solution, particularly a potassium nitrate solution.

In accordance with the present invention, the characteristics of the resulting material, that is, a drawn tungsten wire are substantially improved; the wire has a sufficient stability, even at the highest temperature, resulting in long lifetime when incorporated in electrical apparatus.

BRIEF DESCRIPTION OF THE DRAWING

The single figure is a highly schematic side view of an incandescent lamp having a filament in accordance with the present invention.

DETAILED DESCRIPTION

The tungsten blue oxide is synthesized by thermal decomposition of ammonium paratungstate-tetrahydrate (APW) having the general formula of $$(NH_4)_{10}[H_2W_{12}O_{42}] \cdot 4H_2O \qquad (2)$$

in an ammonium atmosphere of $NH_3$ at a temperature in the range of between about 400° and 550° C.

To carry out the reduction, it is preferred to use a horizontal synthesizing reactor. Typical reduction conditions are as follows:

Starting quantity: about 70 g hexagonal ammonium paratungstate tetrahydrate (APW)

Height of deposition: about 5 mm

Density: loose, not compacted, not treated in a mortar

Container: boat of VA steel, a nickel chromium steel

Rate of supply of $NH_3$: 30 liters per hour (4.0)

Heating Rate: 3 K per minute to 470° C.

Holding Time: 20 minutes

Starting Temperature: Room Temperature

The single figure illustrates a halogen incandescent lamp having a coiled-coil tungsten filament made in accordance with the present invention. The invention, of course, is applicable to many other types of lamps as well, the particular lamp being selected merely for purposes of illustration.

The lamp 20 has a quartz glass envelope 22 containing two pinch sealed in leads having outer terminal portions 32, 32', inner terminal leads 26, 26', connected to opposite ends of intermediate molybdenum sealing foils 28, 28', respectively. A compact coiled-coil tungsten filament 24, made according to the invention, is attached to one end to inner lead 26 and at the other to inner lead 26'. The leads are connected to the molybdenum sealing foil by suitable means, such as welding. Leads 26 and 26'are made of molybdenum. The envelope 22 is filled with a mixture of noble gas, and a halogen compound, such as chlorine bromide, and, optionally, nitrogen, hydrogen, and a getter such as phosphorus.

In operation, the filaments are heated to temperatures of over 2,300° C.; the higher the temperature, the more light output for any given power input. In stage and studio lights, the filaments are operated at substantially higher temperatures, for example 2,900° C. and even higher, for example up to 3200° C.

EXAMPLE

Doping with a potassium nitrate solution is carried out as follows: 70 g tungsten blue oxide are mixed in a 250 ml beaker with 20 ml deionized water. 0.8 g (5000 ppm K/W) of solid potassium nitrate are added. The suspension is then stirred occasionally by hand, for about an hour, at about 70° C. This suspension is then heated and steamed off until dry. The samples are dried for 10 hours in a drying chamber at 120° C. before they are reduced in a synthesizing reactor by means of hydrogen to α-tungsten at conditions such as those set forth hereinabove. The reaction is carried out under the following conditions:

A typical throughput of $H_2$ is 20 to 60 l/h.

A typical end temperature is 800° to 950° C.

A specific example is given below:

Starting Quantity: 8 g tungsten blue oxide

Height of deposition: about 3 mm

Density: loose, not compacted, not treated in a mortar

Sample Holder: tungsten boat

Reference Sample: tungsten powder

Throughput of $H_2$: 48 l/h

Moisture Content $H_2$: 3 vpm $H_2O$ (dew point −69° C.)

Heating Rate: 5 K/min. (300 K/h)

Starting Temperature: Room Temperature

End Temperature: 850° C.

Holding Time at 850° C.: 25 min.

Overall Time: 3½ hours

In the subsequent treatment of the powder, about 4 g tungsten powder are placed in a polyethylene beaker, and mixed with 7 ml deionized water, and continuously stirred. After a short period of settling, the liquid on top is sucked off. With further stirring, 0.18 ml of a 37% HCl solution is added in the form of drops, and then stirred for 15 minutes. After addition of 15 ml of deionized water, further settling and decanting, 0.18 ml of a 38 to 40% HF solution is added in drops, and again vigorously stirred for 15 minutes. Thereafter, the mixture is again mixed with 15 ml deionized water, and decanted after settling. Four to six times of neutral washing with, each time 15 ml water follows, and then the sample is dried for 1 hour at 120° C.

The potassium content of the resultant washed powder is in the range of between 40 to 120 ppm potassium with respect to tungsten; the potassium is homogeneously distributed.

A tungsten wire made from tungsten prepared as above will contain, besides potassium, only trace quantities of silicon and aluminum, at the most about 30 ppm. An incandescent lamp operated with a filament wire of tungsten of this type has a lifetime of more than 10% longer than lamps having a conventional wire. The wire contains about 80 ppm potassium and less than 10 ppm silicon and aluminum.

We claim:

1. A method of manufacturing a non-sag tungsten wire comprising the steps of (a) providing tungsten blue oxide, wherein the tungsten blue oxide comprises, as a major substance, a hexagonal ammonium tungsten bronze of the formula

wherein x is less than 0.33 and y is less than 0.05;

(b) doping said tungsten blue oxide by adding a doping solution which includes a doping agent to the tungsten blue oxide to obtain doped tungsten blue oxide, wherein said doping agent consists essentially of potassium;

(c) reducing the doped tungsten blue oxide to doped tungsten powder; and (d) compacting the tungsten powder, and drawing the compacted powder to a tungsten wire from the compacted powder.

2. The method of claim 1, wherein said solution includes potassium nitrate.

3. The method of claim 1, wherein said solution is devoid of aluminum or silicon.

4. The method of claim 1, wherein said hexagonal ammonium tungsten bronze comprises more than 70% by weight of the tungsten blue oxide.

5. The method of claim 1, wherein the tungsten blue oxide provided in step (a) is obtained by decomposing ammonium paratungstate in an ammonium atmosphere.

6. The method of claim 5, wherein said decomposing step is carried out at a temperature between about 400° and 550° C.

7. The method of claim 1, wherein said step of drawing the tungsten wire includes drawing a lamp filament wire.

8. A method of manufacturing a non-sag tungsten wire comprising the steps of (a) providing tungsten blue oxide, wherein the tungsten blue oxide comprises as a major substance, a hexagonal ammonium tungsten bronze of the formula

wherein x is less than 0.33 and y is less than 0.05;

(b) doping said tungsten blue oxide by adding a doping solution which includes a doping agent, comprising potassium, to the tungsten blue oxide to obtain doped tungsten blue oxide, wherein said doping solution is essentially devoid of aluminum or silicon impurities;

(c) reducing the doped tungsten blue oxide to doped tungsten powder; and (d) compacting the tungsten powder, and drawing the compacted powder to a tungsten wire from the compacted powder.

9. The method of claim 8, wherein said solution includes potassium nitrate.

10. The method of claim 8, wherein said hexagonal ammonium tungsten bronze comprises more than 70% by weight of the tungsten blue oxide.

11. The method of claim 8, wherein the tungsten blue oxide provided in step (a) is obtained by decomposing ammonium paratungstate in an ammonium atmosphere, optionally at a temperature between about 400° and 550° C.

12. The method of claim 8, wherein said step of drawing the tungsten wire includes drawing a lamp filament wire.

* * * * *